Aug. 24, 1965 S. L. KOMARIK 3,202,085
MEANS FOR SHAPING ARTICLES SUCH AS MEAT PRODUCTS
Filed Aug. 8, 1962 2 Sheets-Sheet 1

Inventor
Stephan L. Komarik
by W. Bartlett Jones,
Attorney

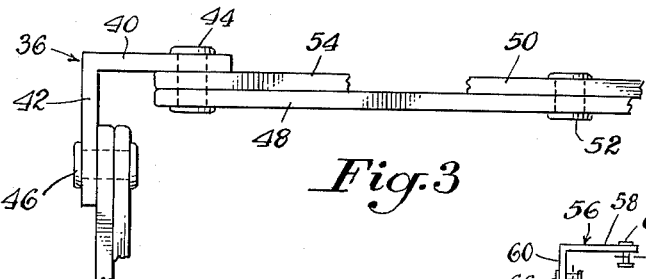
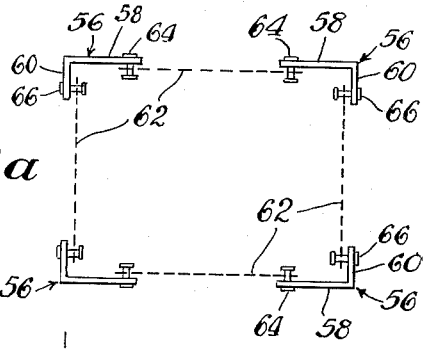
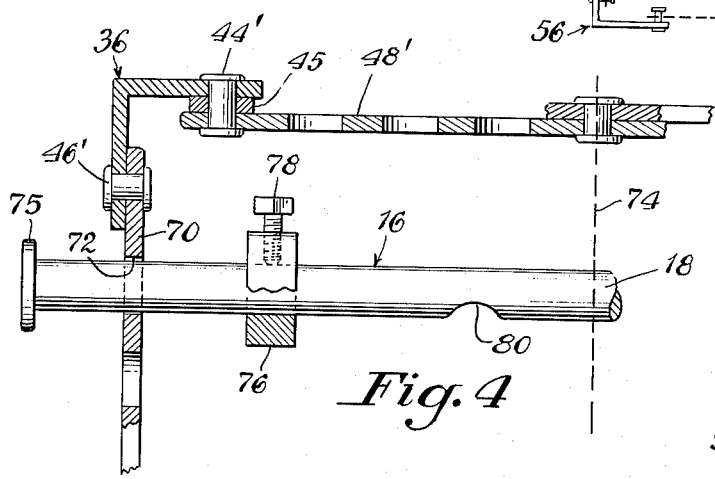
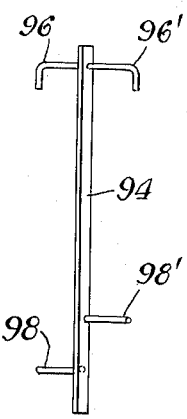
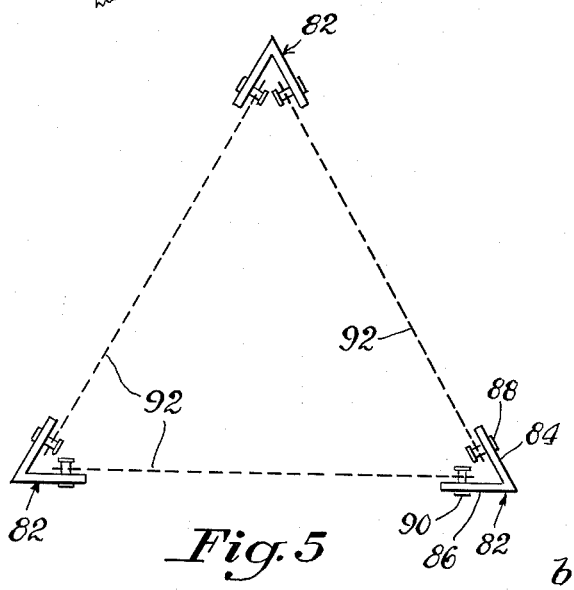
Inventor
Stephan L. Komarik
by W. Bartlett Jones,
Attorney

United States Patent Office

3,202,085
Patented Aug. 24, 1965

3,202,085
MEANS FOR SHAPING ARTICLES SUCH AS MEAT PRODUCTS
Stephan L. Komarik, Chicago, Ill., assignor to The Griffith Laboratories, Inc., Chicago, Ill., a corporation of Illinois
Filed Aug. 8, 1962, Ser. No. 215,737
7 Claims. (Cl. 99—350)

The present invention relates to extensible grip cages, suitable for holding and shaping articles, such as meat products as they shrink in cooking or smoking.

In boiling or steaming or smoking meat products, such as boned hams and large-sized encased meats, such as bologna, there is shrinkage. It is sometimes desirable to produce predetermined shapes of such products, especially rectangular or square shapes, so that the finished product may be sliced, for example, for pre-packaging of sandwich slices.

Another reason for shaping such products pertains to merchandizing exact-weight packages. When irregular forms are cut for small packages, it is difficult to sever a large body of the meat into segments of the same size and weight. When the large body is shaped uniformly in cross-section this difficulty is avoided.

Heretofore, boiled hams have been shaped, but not necessarily uniformly from ham to ham. The cured boned hams are pressed into oblong molds with an open top. The top is closed by a fitted steel plate insert pressed by springs onto the ham. The molds are heated in water at a temperature of 160° to 165° F., until the internal temperature is 150° to 155° F. As the ham shrinks and softens, the plate presses it to conform to the resulting mold. Then, the filled molds are cooled in water. In the process, most of the water-soluble proteins and much of the curing material and flavor ingredients are lost into the water, and the surface of the ham is bleached. The bleached and salt-depleted surface is a good culture medium for bacteria, and exhibits its poor quality by its color when packaged in transparent wrapping for sales display. Additionally, the loss of protein removes binding agent which otherwise should bind the originally separate surfaces of the boned hams, with the result that a slice may not remain integral.

Another procedure is to press the ham, or meat loaf, into a can to be sealed and therein cooked. This results in purging of gelatinous juices from the body of the meat, which must be removed before slicing. The high cost and labor are disadvantageous.

Still another approach to the problem is to stuff the meat, even if it is a boned ham, into a casing for dry smoking, which results in a rounded stuffed casing. In the smokehouse, the full casing is shaped by various spring pressed wire forms or plates. These require much labor and handling and not all of these forms produce a uniform predetermined size, and they do not exert sufficient pressure.

It is the object of the present invention simultaneously to heat and shape meat products to a predetermined size and shape.

It is a particular object to provide a self-gripping form-producing cage within which a body of meat may be cooked, and while it shrinks, be shaped to a predetermined size and shape.

A particular object of the invention is to provide a polygonal extensible cage of which each side is a lazy tongs.

Another object is to provide the cage with means for limiting the extent of lazy tongs elongation.

Still another object of the invention is to hang the caged meat product to be processed while it is gripped by the cage, and to provide a cage of sufficient weight relative to the meat so that as the meat shrinks the weight collapses the cage onto the meat.

Various other and ancillary objects and advantages of the invention will appear hereinafter from the description and explanation of the invention as illustrated in the drawings, in which:

FIG. 3 is a fragmentary enlarged view of a corner of the square cage of FIG. 1 looking down from the line 3—3.

FIG. 3a is a schematic showing of a rectangular cage illustrating modification of the corner links of FIG. 3.

FIG. 4 is a fragmentary cross-sectional view similar to that of FIG. 3, taken on line 4—4 of FIG. 2, showing also a contraction-stop-means therefor.

FIG. 5 is a schematic showing of an equilateral triangular cage illustrating modification of the corner links.

FIG. 6 is a separable and alternate means for limiting the contraction of the cage.

Figures 1, 2:
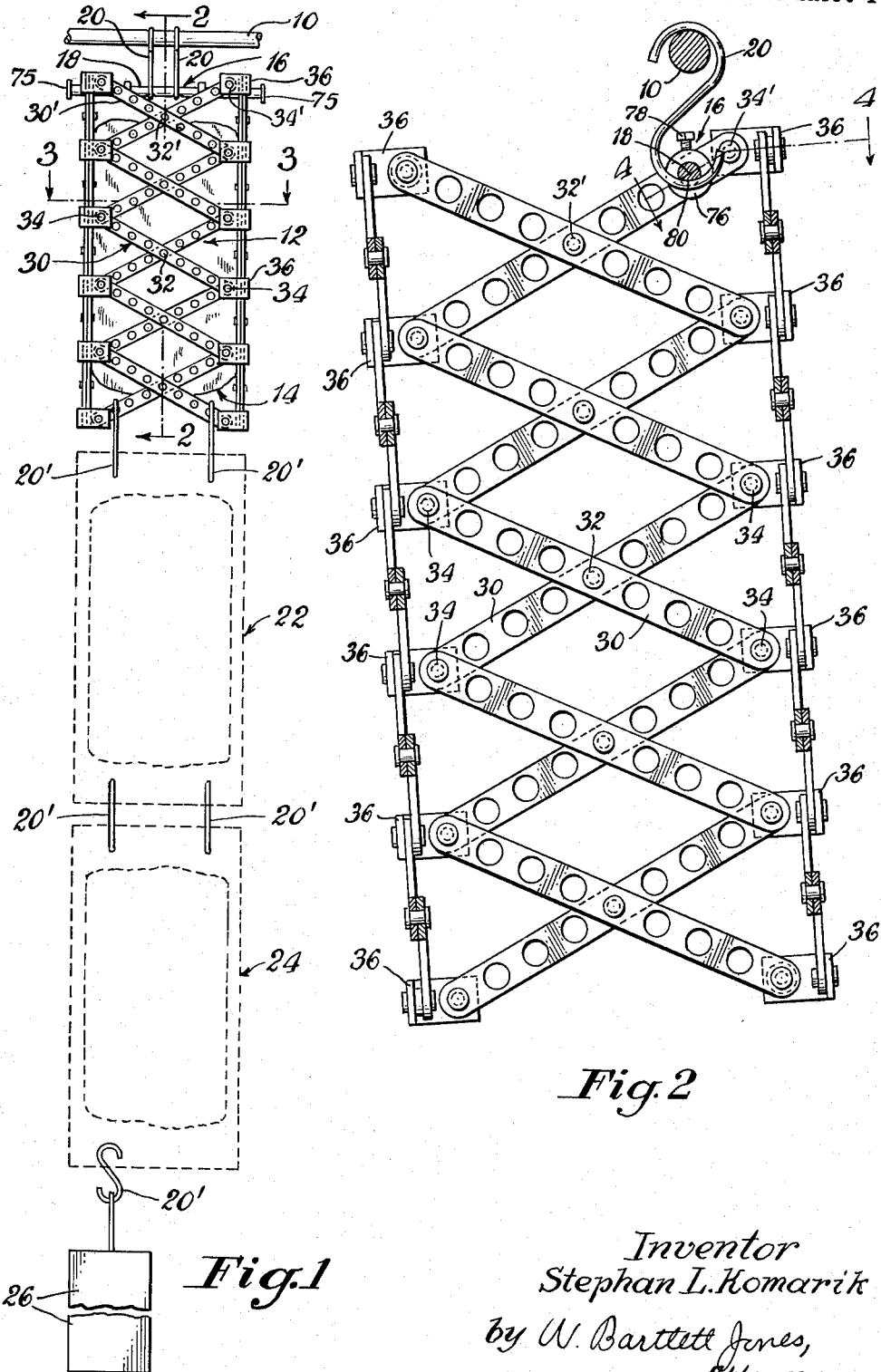
FIG. 1 represents a string of cages containing meat bodies hung in a smokehouse.
FIG. 2 is an enlarged side view of the top cage of FIG. 1, with its contents omitted.

From the foregoing it is to be understood that the invention is not limited to the construction and uses illustrated by the exemplary embodiments thereof shown in the drawings.

The preferred method of using the cage is in a smokehouse, wherein the cage is hung with the meat held therein by the compression resulting from elongating the cage. By this method, there is no suspending cord attached to the meat, subject to breakage or parting from the meat. When necessary, a weight is suspended from the cage to effect elongation and compression as the meat shrinks. In a smokehouse, a first cage is hung on a conventional bar, then one or more cages are hung to the cage above, thus providing the desired weight. It may be necessary to add a weight to the bottom cage of the string.

When the cage is used in a water bath, and not hung, spring means are attached to the cage in a manner to activate elongation and compression as the contents shrinks, thus substituting for actuation by gravity.

When there is a desired limiting cross-section, stop means is supplied to arrest the elongation of the cage at the desired cross-section. Such means in one form may function positively to limit elongation, and in another form positively to limit the cross-dimension. The latter is preferred, since it may be utilized to provide or to receive a hook by which to hang the cage. Various accessory stop means are hereinafter disclosed.

In the drawings, FIG. 1 represents a string of cages containing hams in a smokehouse, the lower cages duplicating the top cage and being represented by dotted lines. Numeral 10 is a bar on which a plurality of such strings may be hung. Numeral 12 represents a first cage containing ham 14. Stop means 16 comprises a rod member 18, latter described, which is carried by the cage across its opening. Two S-hooks 20 suspend the rod 18 from the bar 10.

Numerals 22 and 24 represent two more ham-containing cages hung from cage 12. The bottom cage 24 has a weight 26 suspended from it. Conventional S-hooks 20' used in a smokehouse are shown to effect the suspensions.

The cages are polygonal with each side provided as a lazy tongs each with crossing arms, each arm having three pivots, and having arms of the same dimensions between adjacent pivots. Each set of crossing arms is herein referred to as an X. The ends of each arm are connected by suitable means to the end or ends of arms of the adjacent lazy tongs. Each connecting means is pivoted at one point to one lazy tongs and at another point to the adjacent lazy tongs. The connecting means may be fashioned to provide a polygonal cross-section, to provide for an equilateral cross-section or in the case of a four-sided cage, to provide for a rectangular or a square cross-section.

In FIG. 1, numeral 30 designates an intermediate one of the identical cross-arms on all four sides. The arms 30 shown are of flat bar stock providing an appreciably wide flat side at the interior of the cage to grip the meat. Two such arms cross and are pivoted at 32. The two ends of each arm have pivots 34 joining them with rigid angular connecting means 36. The intermediate arms 30 at pivot 36 are also pivoted to the arm of an adjacent X. The end X's have arms designated 30', the ends of which are pivoted at 34' only to a connecting means 36.

FIG. 3 shows one of the four identical corners to illustrate the connection of adjacent lazy tongs at their interior X's, as seen on the line 3—3 of FIG. 1 the contents being omitted. The connecting means or link designated 36 in FIG. 1 is a right-angle piece having equal-length legs 40 and 42, respectively, carrying pivots 44 and 46. Each of these pivots pivotally joins the ends of the adjacent X's.

Pivot 44 pivots on arm 48 of which its companion arm 50 forms an X at pivot 52. Pivot 44 also pivots on arm 54 of an adjacent X, arms 50 and 54 being shown as fragments to avoid confusion. Pivot 46 has the same relationship to arms as does pivot 44.

When the legs 40 and 42 with their pivots are identical in length as shown in FIG. 3, and are the same on four corners, the cross-section of the cage is always square. FIG. 3a is a diagrammatic view similar to FIG. 3 showing the relationship of four connecting means for providing a rectangular cross-section. Four connectors 56 are shown, each having a leg 58 longer than leg 60. The dotted lines 62 represent the lazy tongs pivoted to the connectors at 64 and 66.

FIG. 4 is similar to FIG. 3 looking down at the top of the cage as seen in FIG. 1. The same connecting link is used, but the pivots 44' and 46' pass through but one arm each, and to replace the missing outside arm, there is a spacing washer 45 at pivot 44'. Arm 48' corresponds to arm 48. Pivot 46' passes through outside arm 70 having hole 72 therein adjacent the pivot. The dotted line 74 indicates the median line on the right side of which the illustrated structure is duplicated. The stop means 16 referred to in FIG. 1 is shown in more detail. Its rod 18 passes freely through hole 72 and its opposite hole, and the end of the rod is upset and enlarged at 75 to prevent removal of the rod. The length of rod 18 is such that it permits the cage to be fully collapsed lengthwise, or in other words, fully expanded in cross-section. Adjustable stops are carried by rod 18 to limit the reduction in cross-section as the cage elongates. A suitable stop is a ring 76 slidable on the rod 16 with a set-screw 78. One such stop is provided each side of center line 74. Also, on each side of center line 74, a niche 80 is provided to locate an S-hook 20 (FIG. 1).

The invention is not limited to rectangular cages. The illustrated connectors of FIGS. 3 and 3a have legs at 90°, which effect the rectangular form. For other polygons, such as an oblique parallelogram or a triangle, the angle between the legs of the connectors are predetermined by the desired cross-section. FIG. 5 shows diagrammatically the structure for an equilateral triangular cage. Three connectors 82 each have equal legs 84 and 86 at 60°, with pivots, respectively, 88 and 90 equidistant from the vertices. The dotted lines 92 represent identical lazy tongs connected together as shown.

FIG. 6 represents another form of stop means which may be provided as a removable member. It is a bar length 94 having two hooks 96 and 96' at the top for hanging the bar over the central pivot of an upper X, for example, over pivot 32' of FIG. 1. Lower on the bar on opposite sides are pins 98 and 98', located to establish one distance from 96 to 98 and a lesser distance from 96' to 98'. The pins 98 and 98' can thus be positioned in the path of another X-pivot as the cage elongates, thus arresting the elongation, and hence, the cross-section. As the central pivots of the X's move apart in elongation, the bar can be positioned to limit the extent to which they move apart.

The invention is not limited to the structures shown and described, and numerous changes and modifications are contemplated as falling within the scope of the appended claims.

I claim:

1. A cage suitable for gripping meat products subject to shrinkage and softening while being processed comprising a polygonal-sided cage of which each side is a lazy tongs with crossing arms each having three pivots, said arms having appreciably wide flat faces at the interior of the cage for gripping the meat, each of said lazy tongs having arms of the same dimensions between adjacent pivots, and rigid angular means pivoted to the ends of the arms of each lazy tongs connecting adjacent lazy tongs.

2. A cage according to claim 1 which has four sides for shaping the meat for sandwich slices.

3. A cage suitable for gripping meat products subject to shrinkage and softening while being processed comprising a polygonal-sided cage of which each side is a lazy tongs with crossing arms each having three pivots, said arms having appreciably wide flat faces at the interior of the cage for gripping the meat, each of said lazy tongs having arms of the same dimensions between adjacent pivots, rigid angular means pivoted to the ends of the arms of each lazy tongs connecting adjacent lazy tongs, and stop means associated therewith for limiting the extent of elongation of the cage.

4. A cage according to claim 3 in which said stop means is one positively to limit reduction in cross-section of the cage, said stop means comprising a rigid length of material to lie across the opening of the cage, said length having means positioned within the cage to arrest motion of opposite sides of the cage toward each other.

5. An assembly for processing meat comprising in combination, an elongated meat mass subject to processing which softens and shrinks the meat, and an enclosing elongated cage surrounding the meat in gripping contact therewith, said cage having sides forming a polygonal cross-section, each side being a lazy tongs with crossing arms each having three pivots, said arms having appreciably wide flat faces at the interior of the cage in gripping contact with the meat, each of said lazy tongs having arms of the same dimensions between adjacent pivots, and rigid angular means pivoted to the ends of arms of each lazy tongs connecting adjacent lazy tongs, whereby when the cage is under the influence of force to elongate it while the meat is processed therein, the contraction of the cross-section shapes the meat.

6. An assembly according to claim 5 in which the cage has four sides for shaping the meat for sandwich slices.

7. The method which comprises processing an elongated piece of meat under conditions to shrink and soften the meat, and during the processing subjecting all of the sides of the elongated piece of meat simultaneously to compressive forces exerted within simultaneously narrowing elongated planar areas, said areas corresponding to the sides of a polygonal prism.

(References on following page)

References Cited by the Examiner

UNITED STATES PATENTS

| | | | |
|---|---|---|---|
| 1,211,051 | 1/17 | Benson | 99—350 |
| 1,828,668 | 10/31 | Kern | 99—349 X |
| 1,989,287 | 1/35 | Parr | 99—349 |
| 2,094,406 | 9/37 | Mincks | 99—349 |
| 2,431,253 | 11/47 | Hoy | 99—351 |
| 2,937,097 | 5/60 | Draudt et al. | 99—194 |
| 3,011,895 | 12/61 | Toepper et al. | 99—107 |
| 3,053,351 | 9/62 | Fulcher | 189—2 |

References Cited by the Applicant

UNITED STATES PATENTS 3,053,351   9/62   Fulcher.

ROBERT E. PULFREY, *Primary Examiner.*

H. LORD, EUGENE R. CAPOZIO, *Examiners.*